(12) United States Patent
Takahashi et al.

(10) Patent No.: US 11,581,549 B2
(45) Date of Patent: Feb. 14, 2023

(54) ALKALINE DRY BATTERIES

(71) Applicant: Panasonic Intellectual Property Management Co., Ltd., Osaka (JP)

(72) Inventors: Yasufumi Takahashi, Hyogo (JP); Yasuyuki Kusumoto, Hyogo (JP); Atsushi Fukui, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 153 days.

(21) Appl. No.: 16/982,279

(22) PCT Filed: Oct. 29, 2018

(86) PCT No.: PCT/JP2018/040025
§ 371 (c)(1),
(2) Date: Sep. 18, 2020

(87) PCT Pub. No.: WO2019/181050
PCT Pub. Date: Sep. 26, 2019

(65) Prior Publication Data
US 2021/0013525 A1    Jan. 14, 2021

(30) Foreign Application Priority Data

Mar. 23, 2018    (JP) .............................. JP2018-057002

(51) Int. Cl.
*H01M 6/06* (2006.01)
*H01M 50/107* (2021.01)
(Continued)

(52) U.S. Cl.
CPC ............... *H01M 6/06* (2013.01); *H01M 4/06* (2013.01); *H01M 6/02* (2013.01); *H01M 50/107* (2021.01);
(Continued)

(58) Field of Classification Search
CPC .... H01M 6/06; H01M 50/107; H01M 50/124; H01M 50/116; H01M 4/06; H01M 6/02;
(Continued)

(56) References Cited

U.S. PATENT DOCUMENTS 5,792,553 A     8/1998  Moriyama et al.
5,968,682 A *  10/1999  Moriyama ........... H01M 50/119
                                                        429/165

FOREIGN PATENT DOCUMENTS

JP          2-276152 A      11/1990
JP          3-59950 A        3/1991
(Continued)

OTHER PUBLICATIONS

International Search Report dated Nov. 27, 2018, issued in counterpart International Application No. PCT/JP2018/040025. (2 pages).

*Primary Examiner* — Brian R Ohara
*Assistant Examiner* — Emily Elizabeth Freeman
(74) *Attorney, Agent, or Firm* — WHDA, LLP

(57) ABSTRACT

An alkaline dry battery includes a battery case, a hollow cylindrical positive electrode accommodated in the battery case, a negative electrode disposed in the hollow portion of the positive electrode, a separator disposed between the positive electrode and the negative electrode, and an electrolytic solution contained in the positive electrode, the negative electrode and the separator. The alkaline dry battery further includes a layer principally including a compound containing a polyoxyethylene group between the positive electrode and the inner surface of the battery case.

7 Claims, 1 Drawing Sheet

(51) Int. Cl.
*H01M 50/124* (2021.01)
*H01M 50/116* (2021.01)
*H01M 4/06* (2006.01)
*H01M 6/02* (2006.01)

(52) U.S. Cl.
CPC ....... *H01M 50/116* (2021.01); *H01M 50/124* (2021.01); *H01M 2220/30* (2013.01)

(58) Field of Classification Search
CPC ....... H01M 2220/30; H01M 2004/025; H01M 50/109
See application file for complete search history.

(56) References Cited

FOREIGN PATENT DOCUMENTS

| | | |
|---|---|---|
| JP | 4-206460 A | 7/1992 |
| JP | 6-223834 A | 8/1994 |
| JP | 8-222189 A | 8/1996 |
| JP | 2012-195129 A | 10/2012 |

* cited by examiner

ALKALINE DRY BATTERIES

TECHNICAL FIELD

The present invention relates to an improvement of the discharge performance of an alkaline dry battery in a low-temperature environment.

BACKGROUND

Alkaline dry batteries (alkaline manganese dry batteries) have a larger capacity and can draw a larger current than manganese dry batteries, and thus have found widespread use. An alkaline dry battery includes a battery case, a hollow cylindrical positive electrode accommodated in the battery case, a negative electrode disposed in the hollow portion of the positive electrode, a separator disposed between the positive electrode and the negative electrode, and an electrolytic solution contained in the positive electrode, the negative electrode and the separator. The electrolytic solution that is used is an aqueous solution of potassium hydroxide or the like, and exhibits a good viscosity and good ion conductivity in a room temperature environment around 20° C.

Patent Literature 1 discloses that a conductive layer is formed on the inner surface of a battery case using a paint which includes 100 parts by mass of a rubber-elastic resin, 50 to 100 parts by mass of a plasticizer, 5 to 50 parts by mass of a crosslinking reaction agent and 20 to 200 parts by mass of a particulate conductive material. A carbon material is used as the conductive material. The plasticizer is polyethylene glycol (PEG) or the like. The PEG content in a conductive layer formed from the paint is about 50 mass % at maximum.

CITATION LIST

Patent Literature

PTL 1: Japanese Published Unexamined Patent Application No. 8-222189

SUMMARY OF INVENTION

Alkaline dry batteries have a drawback in that the discharge time is very short when the batteries are discharged in a low-temperature environment. Even the alkaline dry battery described in Patent Literature 1 has a poor discharge performance in a low-temperature environment. The reason for this is because while an aqueous solution of potassium hydroxide or the like that is used as an electrolytic solution in an alkaline dry battery exhibits a good viscosity and good ion conductivity in a room temperature environment around 20° C., the viscosity is significantly increased and the ion conductivity is lowered in a low-temperature environment such as at 0° C. Specifically, the electrolytic solution (water) significantly increases its viscosity in a low-temperature environment and does not easily circulate to the outer peripheral portion (the portion on the battery case side) of the positive electrode. That is, the outer peripheral portion of the positive electrode is not effectively used, and the positive electrode becomes highly polarized during discharging (in particular, at a final stage of discharging), thus ending the discharging early.

Further, the circulation of an electrolytic solution to the outer peripheral portion of a positive electrode is difficult also when the inner surface of a battery case is covered with a conductive layer containing a water-repellent carbon material. The conductive layer described in Patent Literature 1 contains a carbon material and is water-repellent because the amount of PEG is small.

One aspect of the present disclosure resides in an alkaline dry battery which includes a battery case, a hollow cylindrical positive electrode accommodated in the battery case, a negative electrode disposed in the hollow portion of the positive electrode, a separator disposed between the positive electrode and the negative electrode, and an electrolytic solution contained in the positive electrode, the negative electrode and the separator, and which further includes a layer principally including a compound containing a polyoxyethylene group between the positive electrode and an inner surface of the battery case.

The alkaline dry battery provided according to the present disclosure has excellent discharge performance in a low-temperature environment.

DESCRIPTION OF EMBODIMENTS

Figure 1:
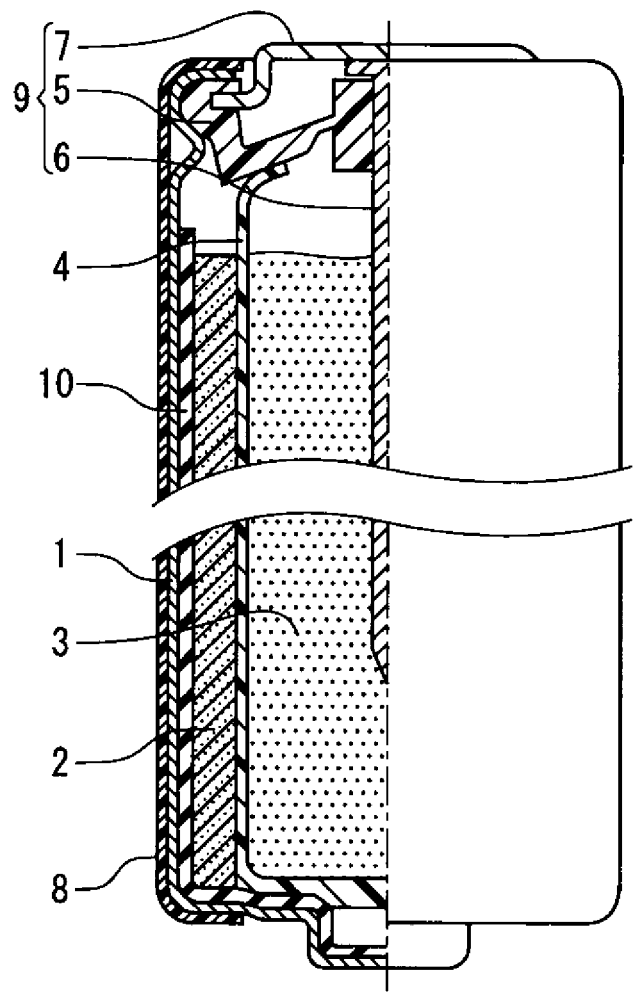
FIG. 1 is a partially sectional front view of an alkaline dry battery in an embodiment of the present invention.

An alkaline dry battery according to an embodiment of the present invention includes a battery case, a hollow cylindrical positive electrode accommodated in the battery case, a negative electrode disposed in the hollow portion of the positive electrode, a separator disposed between the positive electrode and the negative electrode, and an electrolytic solution contained in the positive electrode, the negative electrode and the separator. The alkaline dry battery further includes a layer which principally includes a compound containing a polyoxyethylene group (hereinafter, written as a hydrophilic material) between the positive electrode and the inner surface of the battery case. In the present specification, the layer principally including a hydrophilic material is called a hydrophilic layer.

By arranging the hydrophilic layer between the positive electrode and the inner surface of the battery case, the electrolytic solution (water) is allowed to circulate easily to the outer peripheral portion (the portion on the battery case side) of the positive electrode even in a low-temperature environment where the viscosity of the electrolytic solution is increased. Thus, the outer peripheral portion of the positive electrode is effectively utilized during discharging, and the discharge performance in a low-temperature environment is enhanced. Further, the circulation of the electrolytic solution to the outer peripheral portion of the positive electrode is facilitated even when a water-repellent carbon material is present between the positive electrode and the inner surface of the battery case.

The hydrophilic layer principally includes a hydrophilic material. Here, the term principally means that the content $M_a$ of the hydrophilic material in the hydrophilic layer is not less than 60 mass %. The content $M_a$ of the hydrophilic material means the mass proportion of the hydrophilic material relative to the hydrophilic layer. The content $M_a$ of the hydrophilic material is preferably not less than 80 mass %, and more preferably not less than 90 mass %.

To facilitate the circulation of the electrolytic solution to the outer peripheral portion of the positive electrode, the content $M_b$ of the hydrophilic material in the hydrophilic layer is preferably not less than 0.5 mg/cm², and more preferably not less than 3 mg/cm². The content $M_b$ of the hydrophilic material means the mass of the hydrophilic material applied per cm² of the inner surface of the battery case.

For example, The content $M_a$ and content $M_b$ of the hydrophilic material are determined in the following manner.

The battery constituents (such as the positive electrode) accommodated in the battery case are taken out from the battery case. The layer which covers the inner surface of the battery case and the outer peripheral surface of the positive electrode pellet (hereinafter, the layer will be written as the coating layer) is collected. In the case where the boundary between the coating layer and the positive electrode mixture is not clear, a region that extends with a thickness of 500 μm from the inner surface of the battery case or the outermost periphery of the positive electrode pellet is regarded as the coating layer and is collected. The coating layer that is collected is then cleaned of components such as the positive electrode mixture and the electrolytic solution to give a sample. The mass $M_1$ of the sample is measured. Further, the mass $M_2$ of the hydrophilic material contained in the sample is measured by thermogravimetric/differential thermal analysis (TG/DTA). The content $M_a$ is calculated from $M_2/M_1 \times 100$. The content $M_b$ is calculated from $M_2/C_1 \times 100$ wherein $C_1$ is the area of the region from which the coating layer has been collected. Liquid chromatography mass spectrometry (LC/MS) is used to identify the molecular structure of the component (the hydrophilic material) contained in the sample.

Further, the state of distribution of the hydrophilic material within the battery may be analyzed, for example, in the following manner.

The positive electrode pellet taken out by disassembling the battery is cut to expose a cross section. A region extending with a thickness of 500 μm from the outermost periphery of the positive electrode pellet is taken as the coating layer and is analyzed by time-of-flight secondary ion mass spectrometry (TOF-SIMS). The change in distribution of fragments of the polyoxyethylene group that is a hydrophilic group is detected in the radial direction.

To facilitate the circulation of the electrolytic solution to the outer peripheral portion of the positive electrode, it is preferable that 50% or more of the region of the inner surface of the battery case that is in contact with the positive electrode be covered with the hydrophilic layer. It is more preferable that 75% or more of the region of the inner surface of the battery case in contact with the positive electrode be covered with the hydrophilic layer.

The hydrophilic material preferably includes at least one selected from the group consisting of polyethylene glycols and surfactants having a polyoxyethylene group. In particular, the hydrophilic material more preferably includes a polyethylene glycol for the reason that such a hydrophilic material has excellent hydrophilicity and is easily applied to the inner surface of the battery case to form a hydrophilic layer.

The average molecular weight of the polyethylene glycol is preferably not less than 200 and not more than 6000. In this case, the hydrophilic material can easily form a film on the inner surface of the battery case without using an organic solvent. To attain further enhancements in discharge performance under a low-temperature environment, the average molecular weight of the polyethylene glycol is more preferably not less than 200 and not more than 1000.

As the surfactant having a polyoxyethylene group, an organic surfactant may be added between the positive electrode and the battery case. The surfactant easily forms a hydrophilic film at the interface between the positive electrode and the battery case, and will play a role of promoting the liquid flow into and out of the positive electrode during storage and discharging. Some preferred surfactants are organic phosphoric acid ester surfactants, polyoxyethylene alkyl ethers, amphoteric surfactants, sulfonated organic acid surfactants, sulfated organic acid surfactants, hexyl diphenyl oxide sulfonic acid, and combinations of two or more of these surfactants. In particular, nonionic surfactants having a polyoxyethylene group such as polyoxyethylene alkyl ethers are more preferable.

In the surfactants, the number of repetitions of the oxyethylene groups constituting the hydrophilic polyoxyethylene group is, for example, not less than 5 and not more than 136, and preferably not less than 9 and not more than 100.

From the point of view of the reduction of internal resistance (contact resistance between the positive electrode and the battery case), the hydrophilic layer preferably further includes a particulate conductive material. In this case, the hydrophilic layer may be a layer (a mixture film) of a mixture of a hydrophilic material and a conductive material. Alternatively, the hydrophilic layer may be composed of a layer (a conductive film) which contains a conductive material and covers the inner surface of the battery case, and a layer (a hydrophilic film) which contains a hydrophilic material and is disposed on the surface of the conductive film. When the conductive film has voids, part of the hydrophilic film may be embedded in the voids.

The conductive material that is used is, for example, a carbon material. Even in the case where a water-repellent carbon material is used, the movement of water in the electrolytic solution to the outer peripheral portion of the positive electrode is sufficiently promoted because the hydrophilic layer contains a large amount of the hydrophilic material. Examples of the carbon materials include graphites and carbon blacks. From the point of view of reducing the internal resistance, the conductive material preferably includes, for example, not less than 60 parts by mass and not more than 75 parts by mass of graphite, and not less than 25 parts by mass and not more than 40 parts by mass of carbon black. The average particle size of the conductive material is, for example, not less than 30 nm and not more than 100 nm.

The hydrophilic layer includes at least a hydrophilic material, and may further contain a conductive material and a binder where necessary. For example, the hydrophilic layer is formed by applying a predetermined paint to the inner surface of the battery case. The paint may contain a conductive material and a solvent as required.

To control the viscosity exhibited during application and to ensure settling of the paint applied, the hydrophilic layer may contain a binder in an amount of not less than 10 parts by mass and not more than 80 parts by mass, for example, not less than 15 parts by mass and not more than 60 parts by mass. Examples of the binders which may be used include butadiene acrylonitrile, styrene butadiene and polyvinyl butyral.

In an embodiment, a conductive paint may be applied to the inner surface of the battery case to form a conductive film, and a hydrophilic paint may be applied to the surface of the conductive film to form a hydrophilic film. For example, the conductive paint contains a conductive material, a binder and a solvent.

It is preferable that a recess be disposed on the surface (the outer peripheral surface) of the positive electrode opposed to the battery case. The recess on the outer peripheral surface of the positive electrode holds the electrolytic solution therein to offer an additional utilization of the outer peripheral portion of the positive electrode, thus achieving further enhancements in discharge performance under a low-temperature environment. The recess is preferably formed along the axial direction of the cylindrical positive electrode. To prevent pellet collapse, it is preferable that a plurality of recesses be not arranged diagonally in a cross section perpendicular to the axial direction of the cylindrical positive electrode. To increase the utilization of the positive electrode by the holding of the electrolytic solution, recesses may be formed not only on the outer peripheral surface but also on the bottom of the pellet.

Hereinbelow, an alkaline dry battery according to an embodiment will be described in detail with reference to the drawings. The present invention is not limited to the embodiment described below. Further, the present invention may be modified appropriately without impairing the advantageous effects of the present invention. Furthermore, the embodiment described below may be combined with other embodiments.

FIG. 1 is a half sectional front view of an alkaline dry battery according to an embodiment of the present invention. FIG. 1 illustrates an example of cylindrical batteries having an inside-out structure. As illustrated in FIG. 1, the alkaline dry battery includes a hollow cylindrical positive electrode 2, a gelled negative electrode 3 disposed in the hollow portion of the positive electrode 2, a separator 4 arranged therebetween, and an electrolytic solution (not shown), and these are accommodated in a bottomed cylindrical battery case 1 that also serves as a positive electrode terminal. The electrolytic solution is an alkaline aqueous solution. A hydrophilic layer 10 is disposed between the positive electrode 2 and the inner surface of the battery case 1.

The positive electrode 2 is arranged in contact with the inner wall of the battery case 1 via the hydrophilic layer 10. The positive electrode 2 contains manganese dioxide and the electrolytic solution. The hollow portion of the positive electrode 2 is filled with the gelled negative electrode 3 via the separator 4. The negative electrode 3 contains a negative electrode active material including zinc, and usually further contains the electrolytic solution and a gelling agent.

The separator 4 has a bottomed cylindrical shape and contains the electrolytic solution. The separator 4 is composed of a cylindrical separator and a bottom paper. The separator 4 is arranged along the inner surface of the hollow portion of the positive electrode 2 and separates the positive electrode 2 and the negative electrode 3 from each other. Thus, the separator arranged between the positive electrode and the negative electrode means this cylindrical separator. The bottom paper is arranged at the bottom of the hollow portion of the positive electrode 2 and separates the negative electrode 3 and the battery case 1 from each other.

The opening of the battery case 1 is sealed with a sealing unit 9. The sealing unit 9 is composed of a gasket 5, a negative electrode terminal plate 7 also serving as a negative electrode terminal, and a negative electrode current collector 6. The negative electrode current collector 6 is inserted in the negative electrode 3. The negative electrode current collector 6 has a nail-like shape having a head and a body. The body of the negative electrode current collector 6 is inserted in a through hole provided in a central tubular portion of the gasket 5, and the head is welded to a central flat portion of the negative electrode terminal plate 7. The open end of the battery case 1 is crimped to a flange portion of the peripheral edge of the negative electrode terminal plate 7 via an outer peripheral end portion of the gasket 5. An exterior label 8 is attached to cover the exterior surface of the battery case 1.

The alkaline dry battery will be described in detail below.

(Negative Electrodes)

Examples of the negative electrode active materials include zinc and zinc alloys. From the point of view of corrosion resistance, the zinc alloy may include at least one selected from the group consisting of indium, bismuth and aluminum. The indium content in the zinc alloy is, for example, 0.01 to 0.1 mass %, and the bismuth content is, for example, 0.003 to 0.02 mass %. The aluminum content in the zinc alloy is, for example, 0.001 to 0.03 mass %. From the point of view of corrosion resistance, the proportion of elements other than zinc in the zinc alloy is preferably 0.025 to 0.08 mass %.

The negative electrode active material is usually used in the form of a powder. From the points of view of the packing density of the negative electrode and the diffusibility of the electrolytic solution within the negative electrode, the average particle size (D50) of the negative electrode active material powder is, for example, 100 to 200 μm, and preferably 110 to 160 μm. Incidentally, the average particle size (D50) in the present specification is the median diameter in a volume-based grain size distribution. The average particle size is determined using, for example, a laser diffraction/scattering particle size distribution analyzer.

For example, the negative electrode is obtained by mixing a powder of the zinc-containing negative electrode active material, a gelling agent, and an electrolytic solution. The gelling agent is not particularly limited and may be any known gelling agent used in the field of alkaline dry batteries. For example, a water-absorbing polymer or the like may be used. Examples of such gelling agents include polyacrylic acid and sodium polyacrylate. The gelling agent is added in an amount of, for example, 0.5 to 2.5 parts by mass per 100 parts by mass of the negative electrode active material.

For purposes such as to control the viscosity, a surfactant such as a polyoxyethylene group-containing compound or a phosphoric acid ester may be added to the negative electrode. In particular, for example, a phosphoric acid ester or an alkali metal salt thereof is preferable. To ensure that the surfactant will be dispersed in the negative electrode more uniformly, it is preferable that the surfactant be added beforehand to the electrolytic solution used in the fabrication of the negative electrode.

A compound which contains a metal with a high hydrogen overvoltage such as indium or bismuth may be appropriately added to the negative electrode in order to enhance the corrosion resistance. To suppress the growth of dendrites such as zinc, a small amount of a silicic acid compound such as a silicic acid or a potassium salt thereof may be appropriately added to the negative electrode.

(Negative Electrode Current Collectors)

Examples of the materials of the negative electrode current collector that is inserted in the gelled negative electrode include metals and alloys. The negative electrode current collector preferably includes copper, and may be made of, for example, an alloy containing copper and zinc such as brass. Where necessary, the negative electrode current collector may be plated with tin or the like.

(Positive Electrodes)

The positive electrode usually contains manganese dioxide as the positive electrode active material, and further a conductive agent and an electrolytic solution. Where necessary, the positive electrode may further contain a binder.

The manganese dioxide is preferably electrolytic manganese dioxide. Examples of the crystal structures of the manganese dioxide include α-type, β-type, γ-type, δ-type, ε-type, η-type, λ-type and ramsdellite type.

The manganese dioxide is used in a powder form. To easily ensure properties such as the packing density of the positive electrode and the diffusibility of the electrolytic solution within the positive electrode, the average particle size (D50) of the manganese dioxide is, for example, 25 to 60 μm.

From the points of view of formability and the suppression of positive electrode expansion, the BET specific surface area of the manganese dioxide may be in the range of, for example, 20 to 50 $m^2/g$. The BET specific surface area is determined by measuring and calculating the surface area using the BET equation that is a theoretical equation describing multilayer molecular adsorption. The BET specific surface area may be determined by, for example, a nitrogen adsorption method using a specific surface area measuring device.

Examples of the conductive agents include carbon blacks such as acetylene black, and other conductive carbon materials such as graphites. Some example graphites which may be used are natural graphites and artificial graphites. The conductive agent may be fibers or the like, and is preferably a powder. The average particle size (D50) of the conductive agent is, for example, 3 to 20 μm.

For example, the content of the conductive agent in the positive electrode is 3 to 10 parts by mass, and preferably 5 to 9 parts by mass per 100 parts by mass of the manganese dioxide.

For example, the positive electrode is obtained by compacting into a pellet a positive electrode mixture including a positive electrode active material, a conductive agent, an alkaline electrolytic solution and optionally a binder. Alternatively, the positive electrode mixture may be formed into flakes or granules, classified as required, and compacted into a pellet.

The pellet, after placed into the battery case, may be secondarily pressed using a predetermined tool so as to be in close contact with the inner wall of the battery case.

(Separators)

Examples of the separator materials include celluloses and polyvinyl alcohols. The separator may be a nonwoven fabric mainly composed of fibers of the above material, or may be a microporous film such as of cellophane or polyolefin. A nonwoven fabric and a microporous film may be used in combination. Examples of the nonwoven fabrics include nonwoven fabrics made from a mixture based on cellulose fibers and polyvinyl alcohol fibers, and nonwoven fabrics made from a mixture based on rayon fibers and polyvinyl alcohol fibers.

For example, the bottomed cylindrical separator 4 in FIG. 1 is composed of a cylindrical separator and a bottom paper. The bottomed cylindrical separator is not limited to this configuration, and a separator with a known shape used in the field of alkaline dry batteries may be used. The separator may be composed of a single sheet, or the separator may be composed of a plurality of thin sheets stacked on top of one another. The cylindrical separator may be formed by winding a thin sheet multiple times.

For example, the total thickness of the separator is 200 to 300 μm. The separator preferably has the above thickness as a whole. If a sheet for forming the separator is thin, a plurality of the sheets may be stacked to attain the thickness described above.

(Electrolytic Solutions)

The electrolytic solution is contained in the positive electrode, the negative electrode and the separator. For example, the electrolytic solution is an alkaline aqueous solution containing potassium hydroxide. The concentration of potassium hydroxide in the electrolytic solution is preferably 30 to 50 mass %. The electrolytic solution may further contain zinc oxide. For example, the concentration of zinc oxide in the electrolytic solution is 1 to 5 mass %.

(Battery Cases)

For example, the battery case is a bottomed cylindrical metal case. The metal case is, for example, a nickel-plated steel sheet.

EXAMPLES

The present invention will be described in detail hereinbelow based on EXAMPLES and COMPARATIVE EXAMPLES. However, it should be construed that the scope of the present invention is not limited to the EXAMPLES described below.

Example 1

Cylindrical AA alkaline dry batteries (LR6) illustrated in FIG. 1 were produced in accordance with the following procedures (1) to (4).

(1) Fabrication of Positive Electrode

A graphite powder (average particle size (D50): 8 μm) as a conductive agent was added to an electrolytic manganese dioxide powder (average particle size (D50): 35 μm) as a positive electrode active material to give a mixture. The mass ratio of the electrolytic manganese dioxide powder to the graphite powder was 92.4:7.6. The electrolytic manganese dioxide powder used had a specific surface area of 41 $m^2/g$. 1.5 Parts by mass of an electrolytic solution was added to 100 parts by mass of the mixture, and the resultant mixture was sufficiently stirred and compacted into flakes. A positive electrode mixture was thus obtained. The electrolytic solution used was an alkaline aqueous solution containing potassium hydroxide (concentration: 35 mass %) and zinc oxide (concentration: 2 mass %).

The flaky positive electrode mixture was crushed into granules, which were then classified through a 10-100 mesh sieve, and 11 g of the granules thus obtained were compacted into predetermined hollow cylindrical shapes having an outer diameter of 13.65 mm. Two positive electrode pellets were thus produced.

(2) Fabrication of Negative Electrode

A gelled negative electrode was obtained by mixing 100 parts by mass of a negative electrode active material with 50 parts by mass of an electrolytic solution and 1 part by mass of a gelling agent. The negative electrode active material used herein was a zinc alloy powder (average particle size (D50): 130 μm) containing 0.02 mass % indium, 0.01 mass % bismuth and 0.005 mass % aluminum. The gelling agent used was a mixture of crosslinked branched polyacrylic acid and highly crosslinked linear sodium polyacrylate. The electrolytic solution used here was the same as the electrolytic solution used in the fabrication of the positive electrode.

(3) Formation of Hydrophilic Layer Covering Inner Surface of Battery Case

A bottomed cylindrical battery case 1 made of a nickel-plated steel sheet (outer diameter: 13.80 mm, wall thickness of cylindrical portion: 0.15 mm, height: 50.3 mm) was provided. Conductive paint Varniphite manufactured by Nippon Kokuen Group was applied to the inner surface of the battery case 1, and the wet film was dried to form a conductive film having a thickness of about 10 μm. The mass of the conductive paint applied was 0.3 mg/cm².

Next, an aqueous solution of polyethylene glycol having an average molecular weight of 400 (PEG400) (concentration: 33 mass %) was provided as a hydrophilic paint. The aqueous PEG400 solution was applied to the surface of the conductive film and was dried to form a PEG400 film (a hydrophilic film) having a thickness of about 35 μm. The mass of the hydrophilic material (PEG400) applied was 3.5 mg/cm². In this manner, a hydrophilic layer composed of the conductive film and the hydrophilic film was formed on the inner surface of the battery case.

(4) Assembling of Alkaline Dry Battery

The two positive electrode pellets were vertically inserted into the battery case 1 covered with the hydrophilic layer inside, and were then pressed to form a positive electrode 2 in close contact with the inner wall of the battery case 1. A bottomed cylindrical separator 4 was arranged inside the positive electrode 2, and thereafter an electrolytic solution was poured to impregnate the separator 4. The unit was then allowed to stand for a predetermined time to let the electrolytic solution to permeate through the separator 4 into the positive electrode 2. Thereafter, the inside of the separator 4 was filled with 6 g of the gelled negative electrode 3.

The separator 4 was composed of a cylindrical separator and a bottom paper. The cylindrical separator and the bottom paper were nonwoven fabric sheets (basis weight: 28 g/m²) made of a mixture based on rayon fibers and polyvinyl alcohol fibers in a mass ratio of 1:1. The nonwoven fabric sheet used as the bottom paper had a thickness of 0.27 mm. The separator had been formed by winding a 0.09 mm thick nonwoven fabric sheet three times.

A negative electrode current collector 6 was obtained by pressing general brass (Cu content: about 65 mass %, Zn content: about 35 mass %) into a nail shape, and plating the surface with tin. The diameter of the body of the negative electrode current collector 6 was 1.15 mm. The head of the negative electrode current collector 6 was electrically welded to a negative electrode terminal plate 7 made of a nickel-plated steel sheet. Thereafter, the body of the negative electrode current collector 6 was press-fitted into a central through hole in a gasket 5 mainly formed of polyamide 6,12. In this manner, a sealing unit 9 was produced which was composed of the gasket 5, the negative electrode terminal plate 7 and the negative electrode current collector 6.

Next, the sealing unit 9 was installed at the opening of the battery case 1. During this process, the body of the negative electrode current collector 6 was inserted into the negative electrode 3. The open end of the battery case 1 was crimped to the peripheral edge of the negative electrode terminal plate 7 via the gasket 5, thereby sealing the opening of the battery case 1. An exterior label 8 was applied to cover the exterior surface of the battery case 1. An alkaline dry battery A1 was thus fabricated.

The content $M_a$ and content $M_b$ of the hydrophilic material were as described in Table 1. The content $M_a$ of the hydrophilic material means the mass proportion of the hydrophilic material relative to the hydrophilic layer. The content $M_b$ of the hydrophilic material means the mass of the hydrophilic material applied per cm² of the inner surface of the battery case. A cross section of the hydrophilic layer covering the inner surface of the battery case was observed by SEM, and part of the hydrophilic film had been embedded in the voids in the conductive film.

[Evaluation]

The battery fabricated above was tested by the following method to evaluate the discharge performance in a low-temperature environment.

The battery that had been fabricated was discharged at 250 mA in an environment at 0° C. During this process, the discharge time was measured until the closed circuit voltage of the battery reached 0.6 V. The discharge time was expressed as an index relative to the discharge time of the battery X2 of COMPARATIVE EXAMPLE 2 described later taken as 100.

Examples 2 to 4 and Comparative Example 1

Alkaline dry batteries A2 to A4 and X1 were fabricated and evaluated in the same manner as in EXAMPLE 1, except that the compound described in Table 1 was used as the hydrophilic material, and that the mass of the hydrophilic paint applied to the surface of the conductive film covering the inner surface of the battery case was changed. PEG200 in Table 1 is polyethylene glycol having an average molecular weight of 200. The content $M_a$ and content $M_b$ of the hydrophilic material were as described in Table 1.

Comparative Example 2

An alkaline dry battery X2 was fabricated and evaluated in the same manner as in EXAMPLE 1, except that no hydrophilic film was formed on the surface of the conductive film covering the inner surface of the battery case.

The evaluation results are described in Table 1.

TABLE 1

| | Battery No. | Hydrophilic material | Content $M_a$ (mass %) of hydrophilic material | Content $M_b$ (mg/cm²) of hydrophilic material | Recesses in positive electrode | Discharge performance (index) in low-temperature environment |
|---|---|---|---|---|---|---|
| EX. 1 | A1 | PEG400 | 92 | 3.5 | Absent | 105.9 |
| EX. 2 | A2 | PEG200 | 92 | 3.8 | Absent | 101.5 |
| EX. 3 | A3 | PEG400 | 63 | 0.50 | Absent | 102.5 |
| EX. 4 | A4 | PEG400 | 60 | 0.49 | Absent | 102.2 |
| COMP EX. 1 | X1 | PEG400 | 50 | 0.32 | Absent | 100.3 |
| COMP EX. 2 | X2 | — | 0 | 0 | Absent | 100 |

The battery X2 of COMPARATIVE EXAMPLE 2 did not have a hydrophilic film on the surface of the conductive film covering the inner surface of the battery case, and consequently exhibited a poor discharge performance in a low-temperature environment. The battery X1 of COMPARATIVE EXAMPLE 1 had a hydrophilic film on the surface of the conductive film covering the inner surface of the battery case, but its discharge performance in a low-temperature environment was poor because the hydrophilic material had a content $M_a$ of less than 60 mass % and was not abundant.

The batteries A1 to A4 of EXAMPLES 1 to 4 achieved a high discharge performance in a low-temperature environment by virtue of their having a hydrophilic film on the surface of the conductive film covering the inner surface of the battery case and also the content Ma of the hydrophilic material being not less than 60 mass %. The battery A1 of EXAMPLE 1 using PEG400 as the hydrophilic material attained further enhancements in discharge performance under a low-temperature environment compared to the battery A2 of EXAMPLE 2 using PEG200 as the hydrophilic material.

Example 5

Figure 2:
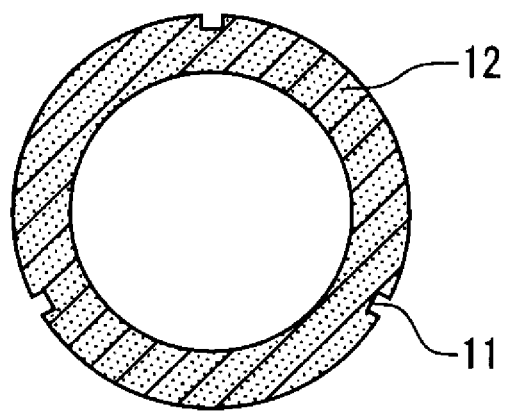
FIG. 2 is a sectional view of a positive electrode pellet having recesses in the outer peripheral surface.

A granular positive electrode mixture was compacted using a predetermined mold to give two hollow cylindrical positive electrode pellets 12 illustrated in FIG. 2. The positive electrode pellet 12 had three recesses 11 on its outer peripheral surface. The three recesses 11 were disposed at regular intervals in a cross section perpendicular to the axial direction of the positive electrode pellet 12, and each recess extended along the axial direction of the positive electrode pellet 12. The three recesses were 0.5 mm in depth and 1 mm in width.

A hydrophilic layer was formed on the inner surface of a battery case in the same manner as in EXAMPLE 1. The two positive electrode pellets 12 were vertically inserted into the battery case. During this process, the recesses 11 in the two positive electrode pellets 12 were aligned with one another using a predetermined jig. Thereafter, the two positive electrode pellets were pressed to form a positive electrode in close contact with the inner wall of the battery case.

An alkaline dry battery A5 was fabricated and evaluated in the same manner as in EXAMPLE 1 except for the above. The content $M_a$ and content $M_b$ of the hydrophilic material were as described in Table 2.

Example 6

Two hollow cylindrical positive electrode pellets having three recesses on the outer peripheral surface were fabricated in the same manner as in EXAMPLE 5. A hydrophilic layer was formed on the inner surface of a battery case in the same manner as in EXAMPLE 2. The two positive electrode pellets were vertically inserted into the battery case while aligning the recesses of the two positive electrode pellets with one another. Thereafter, the two positive electrode pellets were pressed to form a positive electrode in close contact with the inner wall of the battery case.

An alkaline dry battery A6 was fabricated and evaluated in the same manner as in EXAMPLE 1 except for the above. The content $M_a$ and content $M_b$ of the hydrophilic material were as described in Table 2.

The evaluation results are described in Table 2. Table 2 also shows the evaluation results of the batteries A1 and A2 of EXAMPLES 1 and 2.

TABLE 2

| Battery No. | Hydrophilic material | Content $M_a$ (mass %) of hydrophilic material | Content $M_b$ (mg/cm$^2$) of hydrophilic material | Recesses in positive electrode | Discharge performance (index) in low-temperature environment |
|---|---|---|---|---|---|
| EX. 1 A1 | PEG400 | 92 | 3.5 | Absent | 105.9 |
| EX. 5 A5 | PEG400 | 91 | 3.4 | Present | 110.0 |
| EX. 2 A2 | PEG200 | 92 | 3.8 | Absent | 101.5 |
| EX. 6 A6 | PEG200 | 93 | 4.2 | Present | 104.5 |

The batteries A5 and A6 of EXAMPLES 5 and 6 achieved further enhancements in discharge performance under a low-temperature environment by virtue of their having recesses on the outer peripheral surface of the positive electrode.

Example 7

A granular positive electrode mixture was compacted using a predetermined mold to give two hollow cylindrical positive electrode pellets having three recesses on its inner peripheral surface. The three recesses were disposed at regular intervals in a cross section perpendicular to the axial direction of the positive electrode pellet, and each recess extended along the axial direction of the positive electrode pellet. The three recesses were 0.5 mm in depth and 1 mm in width.

A hydrophilic layer was formed on the inner surface of a battery case in the same manner as in EXAMPLE 1. The two positive electrode pellets were vertically inserted into the battery case. During this process, the recesses in the two positive electrode pellets were aligned with one another. Thereafter, the two positive electrode pellets were pressed to form a positive electrode in close contact with the inner wall of the battery case.

An alkaline dry battery A7 was fabricated and evaluated in the same manner as in EXAMPLE 1 except for the above. The content $M_a$ and content $M_b$ of the hydrophilic material were as described in Table 3.

The evaluation results are described in Table 3. Table 3 also shows the evaluation results of the batteries A1 and A5 of EXAMPLES 1 and 5.

TABLE 3

| Battery No. | Hydrophilic material | Content $M_a$ (mass %) of hydrophilic material | Content $M_b$ (mg/cm²) of hydrophilic material | Recesses in positive electrode | Discharge performance (index) in low-temperature environment |
|---|---|---|---|---|---|
| EX. 1 | A1 | PEG400 | 92 | 3.5 | Absent | 105.9 |
| EX. 5 | A5 | PEG400 | 91 | 3.4 | Present (on outer peripheral surface) | 110.0 |
| EX. 7 | A7 | PEG400 | 91 | 3.4 | Present (on inner peripheral surface) | 106.5 |

The discharge performance of the battery A5 of EXAMPLE 5 which had recesses in the outer peripheral surface of the positive electrode pellets was higher than that of the battery A7 of EXAMPLE 7 having recesses in the inner peripheral surface of the positive electrode pellets.

INDUSTRIAL APPLICABILITY

The dry batteries according to an embodiment of the present invention may be used in all kinds of devices that are powered by dry batteries. For example, the dry batteries are suited for such devices as portable audio equipment, electronic games, lights and toys.

REFERENCE SIGNS LIST

1 BATTERY CASE
2 POSITIVE ELECTRODE
3 NEGATIVE ELECTRODE
4 SEPARATOR
5 GASKET
6 NEGATIVE ELECTRODE CURRENT COLLECTOR
7 NEGATIVE ELECTRODE TERMINAL PLATE
8 EXTERIOR LABEL
9 SEALING UNIT
10 HYDROPHILIC LAYER
11 RECESS
12 POSITIVE ELECTRODE PELLET

The invention claimed is:

1. An alkaline dry battery comprising:
a battery case,
a hollow cylindrical positive electrode accommodated in the battery case,
a negative electrode disposed in the hollow portion of the positive electrode,
a separator disposed between the positive electrode and the negative electrode, and
an electrolytic solution contained in the positive electrode, the negative electrode and the separator,
the alkaline dry battery further comprising a layer principally including a compound containing a polyoxyethylene group between the positive electrode and an inner surface of the battery case, wherein the compound containing the polyoxyethylene group is not less than 60 mass % relative to a total mass of said layer.

2. The alkaline dry battery according to claim 1, wherein 50% or more of a region, of the inner surface of the battery case, that is in contact with the positive electrode is covered with the layer.

3. The alkaline dry battery according to claim 1, wherein the compound comprises at least one selected from the group consisting of polyethylene glycols and surfactants having the polyoxyethylene group.

4. The alkaline dry battery according to claim 1, wherein the amount of the compound contained in the layer is not less than 0.5 mg/cm².

5. The alkaline dry battery according to claim 1, wherein the layer further includes a particulate conductive material.

6. The alkaline dry battery according to claim 1, wherein the layer further includes a binder in an amount of not less than 10 parts by mass and not more than 80 parts by mass.

7. The alkaline dry battery according to claim 1, wherein a recess is disposed on a surface of the positive electrode opposed to the battery case.

\* \* \* \* \*